Figure 2:
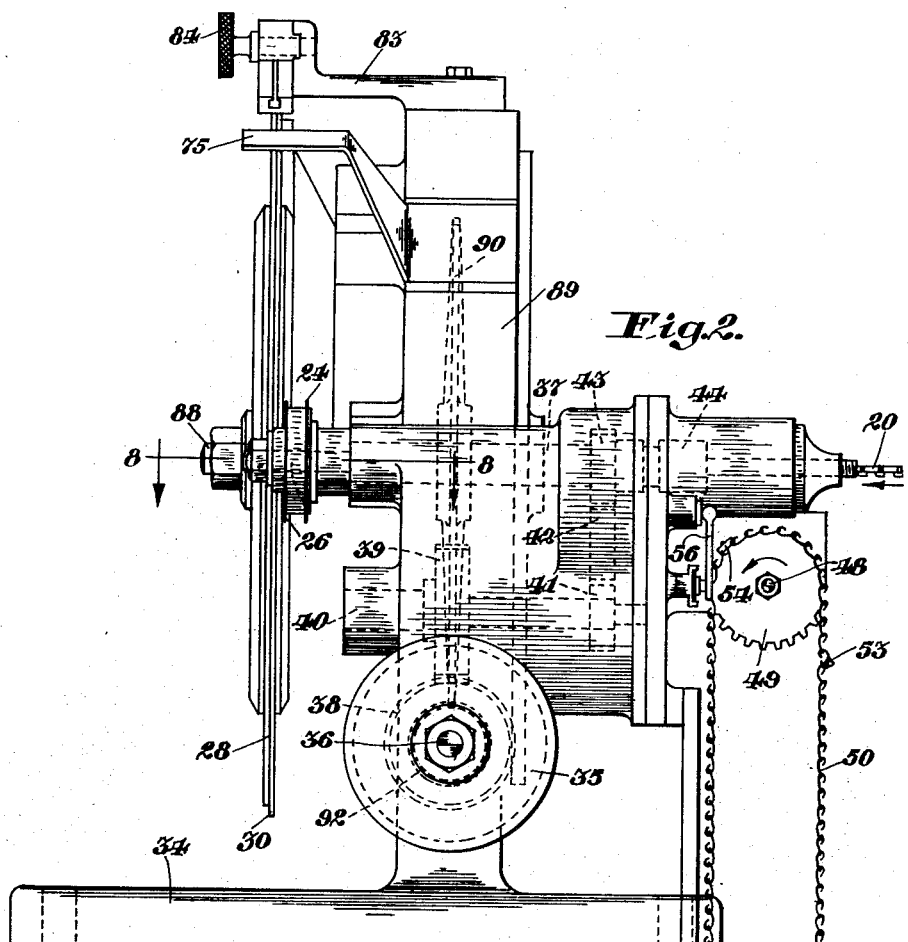

Aug. 8, 1939. G. SUNDBACK 2,169,178
MACHINE FOR MAKING FASTENER STRINGERS
Filed Oct. 31, 1933 5 Sheets-Sheet 1
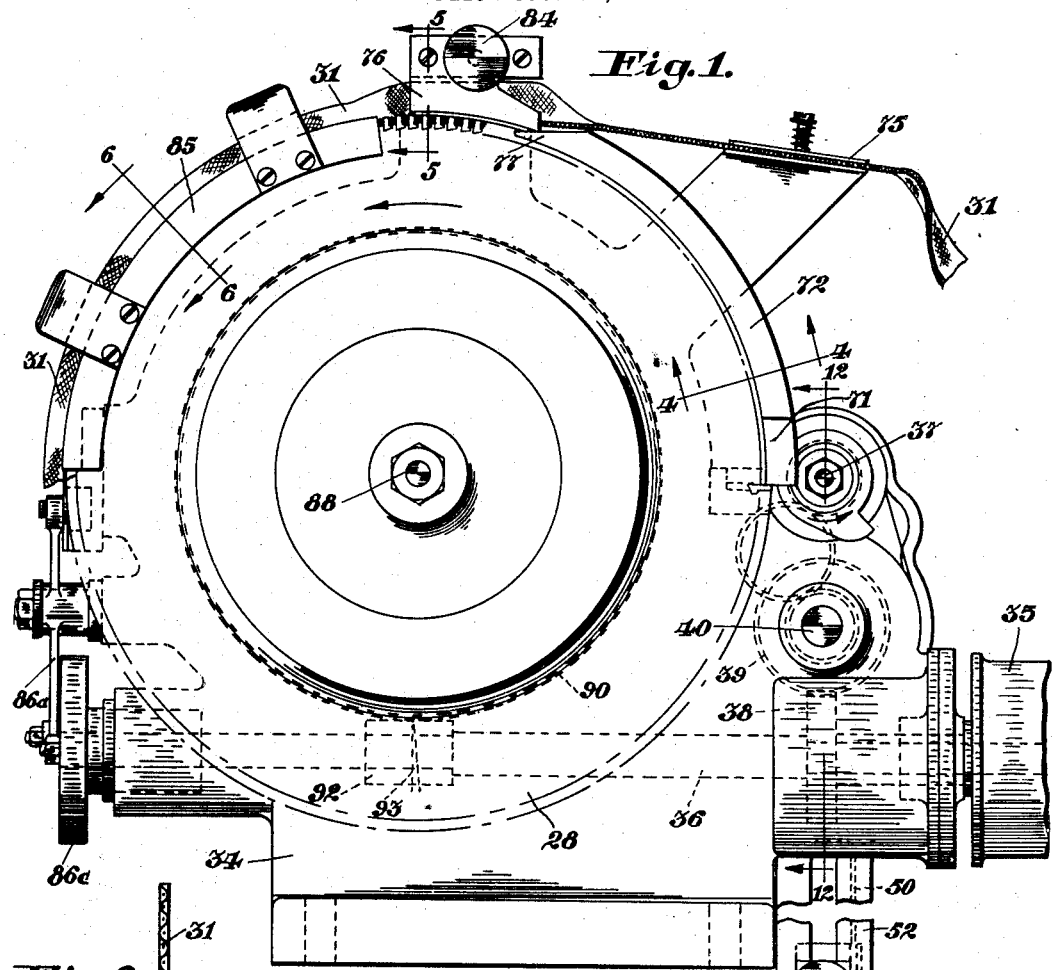
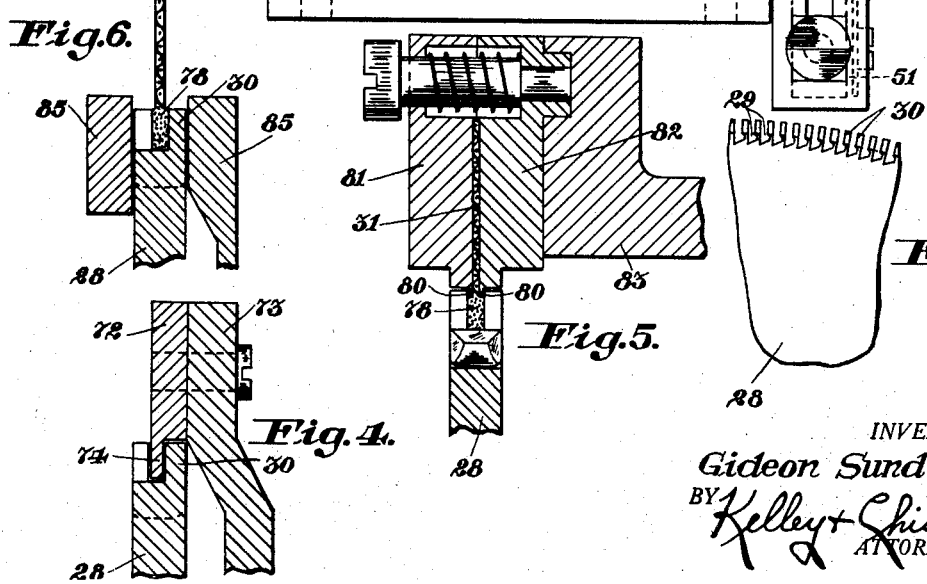
INVENTOR.
Gideon Sundback
BY Kelley + Chisholm
ATTORNEYS.

Aug. 8, 1939. G. SUNDBACK 2,169,178
MACHINE FOR MAKING FASTENER STRINGERS
Filed Oct. 31, 1933 5 Sheets-Sheet 2

INVENTOR.
Gideon Sundback
BY Kelley & Chisholm
ATTORNEYS.

Aug. 8, 1939.  G. SUNDBACK  2,169,178
MACHINE FOR MAKING FASTENER STRINGERS
Original Filed Oct. 31, 1933  5 Sheets-Sheet 3
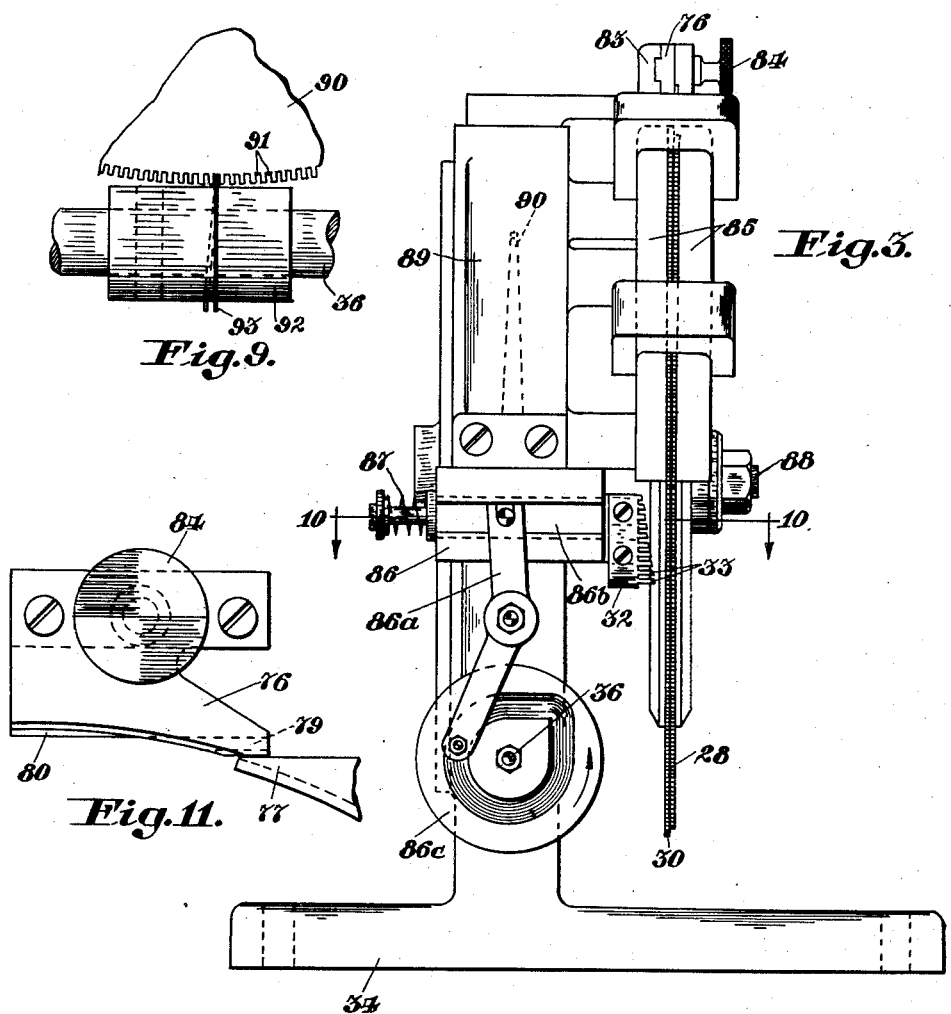
INVENTOR.
Gideon Sundback
BY Kelley & Chisholm
ATTORNEYS.

INVENTOR.
Gideon Sundback
BY Kelley & Chisholm
ATTORNEYS.

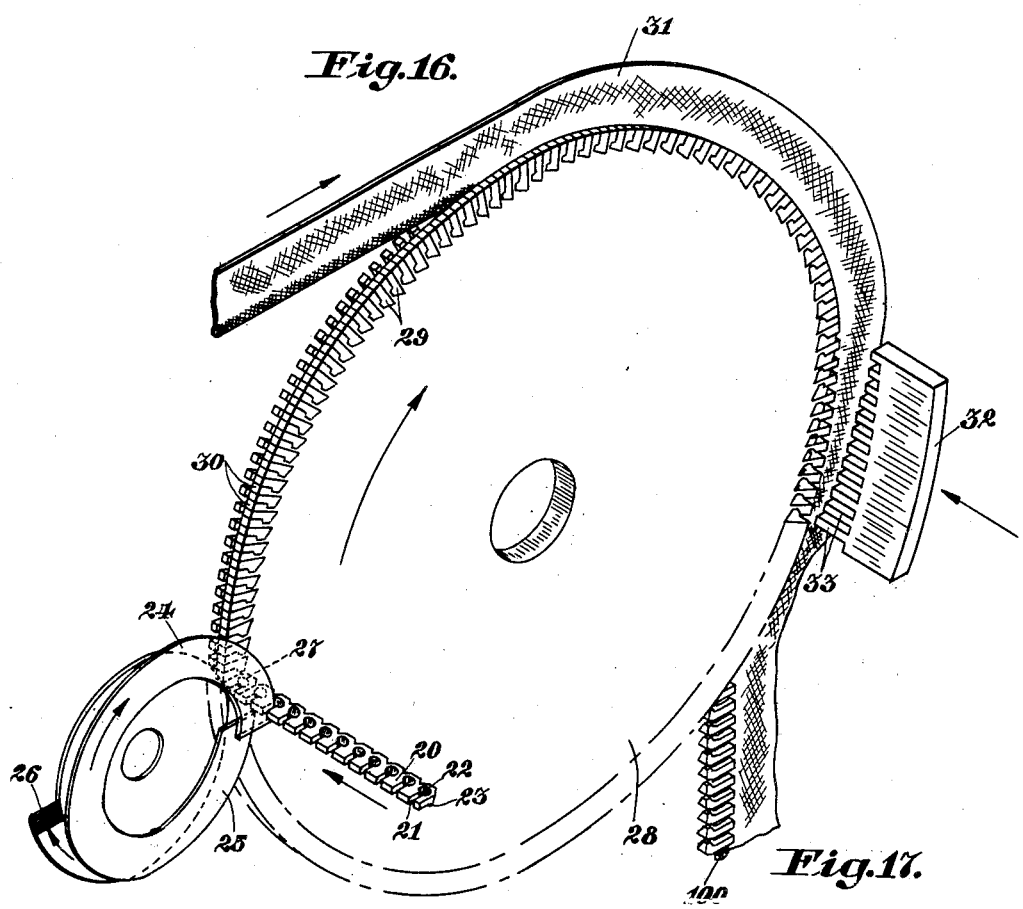
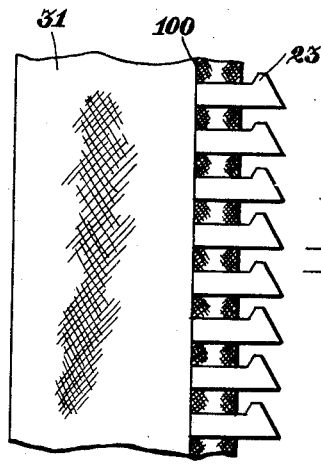
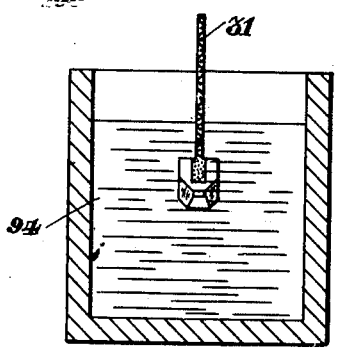

Patented Aug. 8, 1939

2,169,178

UNITED STATES PATENT OFFICE 2,169,178

MACHINE FOR MAKING FASTENER STRINGERS

Gideon Sundback, Meadville, Pa., assignor to Talon, Inc., Meadville, Pa., a corporation of Pennsylvania Application October 31, 1933, Serial No. 696,057
Renewed August 11, 1936

25 Claims. (Cl. 18—1)

This invention relates to machines for making fastener stringers. The term "fastener stringers" as used herein, means a series of fastener elements attached in uniformly spaced relation on the edge of a flexible mounting member which is usually a fabric tape. Two of such stringers when provided with a slider and end stops, make up what is known as a slide fastener.

Various automatic machines have been used for making slide fastener stringers in which the fastener members are made of metal but so far as I know, no machine prior to my invention has been used for making fastener stringers in which the fastener members are made of the non-metallic material. Recent inventions have resulted in slide fasteners suitable for practical use in which the fastener members are made of nonmetallic materials. While a wide range of materials is contemplated by the inventions, it is believed preferable to use an inexpensive soluble plastic material such as pyralin or some of the soluble non-inflammable plastics.

There are different problems presented in the manufacture of stringers having non-metallic members and the machines heretofore used for metal working are wholly useless for non-metallic materials.

My invention is intended particularly to supplement and for use in conjunction with the invention of George H. C. Corner, disclosed in Patent No. 1,920,138, having to do with securing nonmetallic members on a tape by a sticking process; and my prior invention disclosed in application Serial No. 674,056, dealing with the preparation of a fastener member strip.

The present invention has for its object to provide an automatic machine which is capable of cutting individual fastener members from the fastener strip, keeping them under accurate control, and spacing them in the desired accurate spaced relation on the edge of the mounting member, and ejecting them from the machine without disturbing their positions on the tape, until they can be fixed more firmly by the sticking process.

There are various novel elements and subcombinations which will be claimed herein that might be used to advantage in machines for making fastener stringers with metallic fastener members, but the machine as a whole, is designed and intended for the manufacture of fastener stringers with non-metallic fastener members.

One important object of the invention is to provide suitable means for placing the edge of the tape into the parallel sided slots of the non-metallic members with sufficient force to retain the fastener members in position temporarily by friction until they can be fixed in the solvent bath.

Further objects which might be mentioned are to provide a machine which will perform its functions at high speeds in order that a large amount of product may be produced automatically in a given time; to provide a machine which will be of relatively simple nature, rugged and dependable in construction when operated by unskilled workers over long periods of time.

Further general and detailed features of the invention will appear during the course of the following specification and claims.

Figure 8:
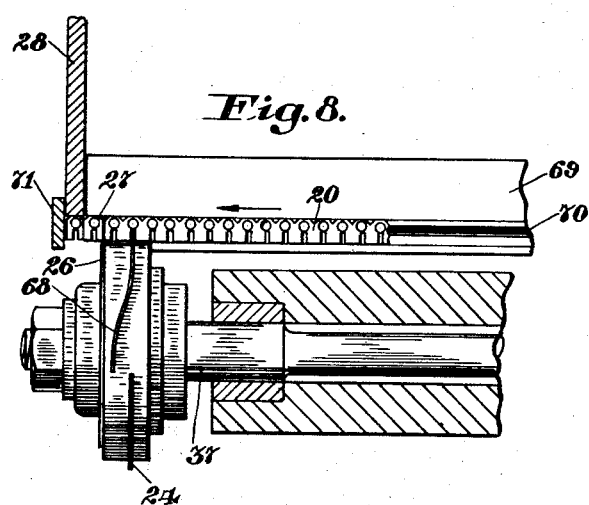
Figures 12, 13, 14, 15:
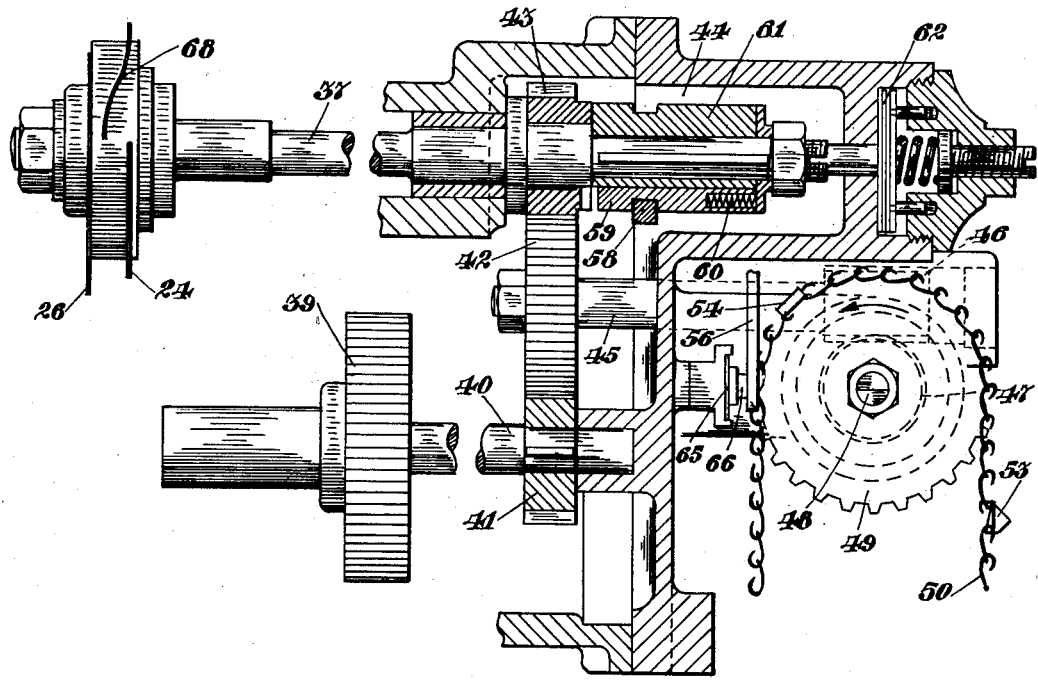

In the accompanying drawings I have shown for purposes of illustration one embodiment which my invention may assume in practice. In these drawings:

Fig. 1 is a front elevation of the machine;
Fig. 2 is a side elevation;
Fig. 3 is an opposite side elevation;
Figs. 4, 5 and 6 are detailed sectional views on lines 4—4, 5—5 and 6—6 respectively of Fig. 1;
Fig. 7 is a detailed view showing a portion of the dial on an enlarged scale;
Fig. 8 is a horizontal sectional view on line 8—8 of Fig. 2;
Fig. 9 is a detailed view of the dial driving mechanism;
Fig. 10 is a horizontal section on line 10—10 of Fig. 3;
Fig. 11 is a detail view showing the tape guide;
Fig. 12 is a vertical sectional view on line 12—12 of Fig. 1;
Fig. 13 is a partial rear end view with parts shown in section;
Fig. 14 is a detail view of the spacing control chain;
Fig. 15 is a plan view of the clutch operating mechanism looking at the bottom side;
Fig. 16 is a schematic view showing certain of the important operations of the machine;
Fig. 17 shows the fixing bath; and
Fig. 18 shows the completed article.

It will facilitate understanding of the machine to refer briefly to the schematic view in Fig. 16. The strip of pyroxylin or other material is automaticaly fed into the machine as indicated at 20; the cloth tape is automatically fed into the machine as shown at 31; and the finished stringer comes out of the machine as indicated at 100. The member strip 20 is made up of completely formed fastener members connected in side by side relation. It has the parallel sided slots 21 along one edge which later serve to receive the tape and along the other edge of the strip are the interlocking formations which comprise recesses 22 on one side and projections 23 on the opposite side.

It will be understood that this strip has been preformed in a suitable manner such as that described in my co-pending application above referred to. The strip is advanced in the direction of the arrow by means of a helical cam feeder 24, which is in constant engagement with at least one of the slots 21. This cam has a straight portion 25 which holds the strip stationary at intervals while the dial is being advanced.

On the same shaft carrying the strip feeder is mounted a cutting knife 26, which cuts off the fastener elements adjacent the die. There is preferably one element between the cutter and the dial as indicated at 27. The dial member 28 consists of a disk having a peripheral edge of the same thickness as the width of the fastener members. The fastener member receiving recesses 29 are shaped in cross-section similar to the shape of the fastener members as viewed in Fig. 18, so that there will be a slight ledge in each recess to engage with the projection 23, and lock the elements in place. It will be noted that projections 30 extend upwardly on one side to support one of the legs of the fastener member while the other side is open. The dial is intermittently moved in the direction of the arrow and a tape 31 is fed tangentially into the slots of the fastener members. At a further point around the periphery of the disk there is provided an ejector 32 moving laterally or in a direction parallel to the axis of the dial. This ejector has teeth 33 which become progressively longer so that each subsequent step will move the fastener members only a slight distance. This prevents any abrupt action which might displace the fastener elements on the fabric tape.

Referring to Fig. 1, the machine is supported on a base 34, and it is driven through a pulley 35 which is mounted on shaft 36. The feed and cutter shaft 37 is driven from the shaft 36 through helical gears 38, 39, shaft 40, gears 41, 42, 43 and clutch mechanism 44 (see Fig. 12).

The spacing control device is driven from gear 42 through shaft 45, worm 46 and worm gear 47 which drives the shaft 48 carrying a sprocket wheel 49. A sprocket chain 50 passes over the sprocket wheel 49 and an idler sprocket 51, which is adjustably mounted on a bracket 52. The particular type of sprocket chain link is illustrated in Fig. 14, but it will be understood that any equivalent mechanical device may be used for this purpose.

The sprocket chain carried a cam member 53 which projects outwardly from the chain and a second cam member 54, which projects laterally of the chain. As will presently be understood, the short distance between the cams will determine the gap spacing between the groups of fastener members, while the long length of chain will determine the length of a group. This will vary depending on the length of fastener required and links may be taken out of or added to the chain to take care of variations in length. The cam 54 travels in the path of the lever 56 and when it strikes the cam surface 57 on such lever, it will be swung to the left as viewed in Fig. 13. This operation rocks the clutch control arm 58 out of engagement with the clutch key 59 thus allowing the clutch key to spring into engagement with the driving gear 43 (see Fig. 12), under the force of spring 60. As noted in Fig. 12, the clutch key drives the feed and cutter shaft 37 through the clutch collar 61, and brake mechanism indicated at 62 serves to stop the cutter shaft quickly when the clutch is disengaged by the inclined surface 55 of the clutch control arm. The clutch control arm is sprung into engagement with the clutch collar by means of the spring 64 upon release of the lever 56. When the lever 56 is pushed backwardly by the cam 54 the latch lever 65 springs into engagement with the lug 66 to lock the clutch arm out of engagement with the clutch collar. During this period the feed and cutter shaft will continue in operation. When the cam 53 on the chain strikes the cam surface 67 on the latch lever, the clutch arm will be released and will spring into engagement with the clutch collar thereby disengaging the clutch. During the interval following and until the cam 54 again strikes the lever 56, the cutter shaft will remain idle.

Referring to Fig. 8 and Fig. 12, the feeding cam 24 comprises a relatively thin plate extended around the shaft 37 and rigidly mounted thereon. This thin plate or flange is straight for about 260° and inclined as at 68, and is extended far enough to overlap the initial end of the feeder so that at least one slot is always engaged by the feeder. The cutting knife 26 is rigidly mounted and has a sharp edge so that it can cut through the non-metallic member material with ease. It is, of course, removable so that it can be sharpened. The guideway 69 for the fastener member strip 20 preferably has a grooved contour as indicated at 70 in Fig. 8, corresponding to the shape of the projection and inclined ends of the fastener members.

Before feeding a strip into the machine it will be trimmed to have square and even ends so that there will be no surplus material to be disposed of. The strip is fed along the guideway intermittently and during each step, a fastener member is pushed into one of the recesses 29 in the dial 28. The fastener member is properly positioned in the recess by the stop member 71.

As shown in Figs. 1 and 4, upon the next movement of the dial the fastener member which has just been received, is engaged by a stationary guide plate 72 which is supported on a bracket 73 and has the guide flange 74 extending into the slots of the fastener members. They are thus held firmly and accurately against any side-wise movement until they approach the tape attaching station.

The tape is fed through an adjustable tension device 75 into a special guide 76 which is positioned so as to overlap the tapered end 77 of the guide plate 72. The tape has a shouldered edge 78 which passes through a correspondingly shaped passageway 79 in the guide 76 (see Fig. 5). This leads the shouldered edge of the tape directly to the end 77 of the guide plate in line with the parallel sided slots of the fastener members. As the tape further progresses it is engaged by the thin flanges 80 which force the shouldered edge of the tape firmly into the slots of the fastener members. The guideway comprises plates 81, 82 which are adjustably supported on a bracket 83 through the adjustment bolt 84. If desired, the plates 81, 82 may be provided with extensions to support the legs of the fastener members against their outer surfaces to prevent distortion when the tape is forced in.

The tape is now engaged in the slots of the fastener members and passes through guides 85, for a suitable distance preferably about 90° to the ejecting station. This will allow for enough fastener elements to be engaged on the tape so that they will exert the required pull on the tape for moving it through the tension device. The ejecting mechanism is best seen in Figs. 3 and 10. The ejector member 32 is reciprocated in a guideway 86 by means of a lever 86a having a connection with the sliding member 86b which carries the ejector member 32. The lever 86a is rapidly oscillated in timed relation to the operation of the dial by means of the cam 86c having a suitable contour such as indicated in Fig. 3. If desired a spring return device 87 may be used. The cam 86c is mounted directly on the end of shaft 36.

The dial 28 is mounted on a shaft 88 which is supported in bearings on opposite sides of the housing 89. The actuating mechanism for the dial must be accurate and firm since the dial must start and stop at a high rate of speed and be positioned accurately at each stop. The dial driving member 90 is keyed to the shaft 88 inside the housing 89 and has a series of notches 91 corresponding in number to the fastener member recesses in the main dial. The shaft 36 carries a collar 92 provided with a thin flange 93 having a straight portion during which the dial is held stationary and an inclined portion, during which the dial is moved. In other words, the dial is a varied form of worm gear. If desired for the purpose of strength and ruggedness, an ordinary worm wheel and gear may be substituted and the worm driven through a properly designed Geneva motion.

One modification which might conveniently be made is to feed in several strips into one dial. In this manner multi-colored fasteners can be obtained by the simultaneous feeding of strips of different colored materials. Also the production of the machine would be increased.

As a result of my invention it will be understood that the fastener members are set on the edge of the tape in the desired positions and are held temporarily by friction. They should be handled carefully, however, until they are fixed firmly in the solvent bath which is indicated in Fig. 17, by the numeral 94. The dipping of the fastener members for the required interval will allow the solvent to penetrate into the fabric and soften the surfaces of the fastener members sufficiently to cause them to adhere to the fabric. This dipping also simultaneously smooths up all rough surfaces and sharp corners. After the solvent is evaporated the material again hardens and the fastener stringers are then completed.

While I have shown and described in this application, one embodiment which my invention may assume in practice, it will be understood that this embodiment is merely for the purposes of illustration and description and that various other forms may be devised within the scope of my invention as set forth in the appended claims.

I claim:

1. In a machine for making fastener stringers, the combination of means for feeding fastener members in predetermined positions, each fastener member having a slot, holding means having recesses for receiving the fastener members with the same uniform spacing and the same relative arrangement as the members on a finished stringer, means for introducing said fastener members into said recesses, means for guiding the edge of a tape into the slots of said members while held in such uniform spacing and arrangement, means for ejecting the assembled members and tape from said holding means, and means for automatically returning said holding means to position for receiving fastener members.

2. In a machine for making fastener stringers, the combination of means for guiding a fastener member strip, means for cutting fastener members from said strip, each member having a slot, a holder having receiving recesses movable adjacent said strip, said recesses being spaced in accordance with the spacing of the members on a finished stringer, and mechanical means for introducing the severed fastener members into said recesses with the slots aligned to position said fastener members for application to a carrier member.

3. In a machine for making fastener stringers, the combination of a guideway for a fastener member strip, means for feeding said strip along said guideway and for severing the strip into individual fastener members, and means for uniformly spacing and aligning said several fastener members as they are severed from the strip, said means serving to hold said fastener members in the desired relative positions for direct attachment to a carrier member.

4. In a machine for making fastener stringers, the combination of a movable holder having uniformly spaced recesses for holding fastener members with their tape receiving slots aligned, means for continuously inserting the edge of a tape into said aligned slots, and means for continuously removing said fastener members and tape together from said holding means at a point spaced from the point of introduction of the tape.

5. In a machine for making fastener stringers, the combination of a dial having uniformly spaced recesses around its periphery for receiving fastener members, the spacing being equal to the spacing of fastener members on a finished stringer, means for feeding fastener members into said recesses, means for guiding a tape along the periphery of said dial to a series of said fastener members while held in the dial, and means for removing said assembled fastener members and tape from said dial, said fastener members being retained in position on said tapes by friction upon removal from said dial.

6. In a machine for making fastener members, a magazine having recesses for holding a series of fastener members in uniformly spaced and aligned relation, means for guiding a tape in the direction of said series of members and temporarily attaching said tape to said series of members, said recesses being open at the sides of said magazines to permit lateral removal of said attached members.

7. In a machine for making fastener stringers, the combination of a dial mounted for rotary movement and having uniformly spaced recesses around its periphery for receiving the fastener members, means for imparting an intermittent rotary movement to said dial, means for feeding fastener members into said recesses between movements of said dial, and means for interrupting the fastener member feeding periodically while the dial operation continues in order to arrange the fastener members in spaced groups along the periphery of said dial.

8. In a machine for making fastener stringers, the combination of a dial mounted for rotary movement, means for feeding a strip of fastener members connected in side by side relation and parallel with the axis of said dial and in line with its peripheral recesses, means for severing fastener members from the end of said strip and for introducing them into said peripheral recesses of the dial successively as the dial is intermittently advanced, and means for guiding a carrier peripherally of the dial and attaching the fastener members at least temporarily thereto.

9. The combination of means for feeding a fastener member strip containing formed fastener members with slots along the edge of the strip and interlocking portions along the other edge of the strip, which comprises means engaging in said slots and operative to advance the strip intermittently, and a cutter for severing individual fastener members from the end of said strip as it is advanced.

10. The combination of means for feeding a fastener member strip having slots along one edge and interlocking portions along the other edge which comprises a rotary helical cam engaging in said slots for advancing the fastener member strip, and a cutter for severing the fastener members from the strip as it advances.

11. The combination of means for feeding a fastener member strip having slots along one edge and interlocking portions along the other edge which comprises a rotary helical cam engaging in said slots for advancing the fastener member strip, a cutter for severing the fastener members from the strip as it advances, and means for periodically interrupting the operation of said feeding cam and cutter.

12. In a machine for making fastener stringers, means for supplying spaced apart groups of fastener members, the members in each group being closely and uniformly spaced, comprising a holder having fastener member receiving recesses with the desired uniform spacing, means for feeding a fastener member strip, means for cutting fastener members from said strip and placing them into said recesses, and means for intermittently interrupting the operation of said strip feeding means while said holder continues in operation.

13. In a machine for making fastener stringers, a dial having fastener member receiving recesses around its periphery spaced in accordance with the desired spacing of fastener members on the stringer, and actuating means for said dial operative to advance the dial intermittently a distance equal to the spacing between the peripheral recesses.

14. In a machine for making fastener stringers, a dial having peripheral recesses for receiving fastener members spaced in accordance with the desired spacing of fastener members on the stringer, means for actuating the dial comprising a driving wheel having the same number of teeth as peripheral recesses, and means engageable with said teeth for intermittently advancing said wheel and dial one tooth at a time.

15. In a machine for making fastener stringers, the combination of a holder for fastener members having uniformly spaced recesses for receiving the interlocking ends of fastener members, teeth projecting outwardly along one side of the holder to support one leg of said fastener members, the other side of the holder being cut away to expose the opposite leg of each fastener member, and means for inserting a tape between the legs of fastener members held in said holder, said tape and assembled fastener members being removable laterally from said holder.

16. In a machine for making fastener stringers, the combination of a rotary dial holder for fastener members having intermittently spaced fastener member recesses around its periphery and open at the sides, means for introducing fastener members into said dial with their tape receiving slots extending outwardly, and a guide engageable in said slots to maintain said fastener members in proper position in said recesses as the dial advances.

17. In a machine for making fastener stringers, the combination of a rotary dial holder for fastener members having intermittently spaced fastener member recesses around its periphery and open at the sides, means for introducing fastener members into said dial with their tape receiving slots extending outwardly, a guide engageable in said slots to maintain said fastener members in proper position in said recesses as the dial advances, means for feeding a tape in a tangential direction into the tape receiving slots of the fastener members, said guide leading up to a point closely adjacent the entry of the tape.

18. In a machine for making fastener stringers, a holder having uniformly spaced fastener member receiving recesses, a stationary guide for holding the fastener members aligned in said recesses, means for guiding a tape into position and forcing the edge of said tape between the legs of said fastener members comprising a guide positioned closely adjacent the end of said first mentioned guide whereby the tape is fed into said fastener members immediately after they leave said first mentioned guide.

19. In a machine for making fastener stringers, a holder having intermittently spaced receiving recesses for fastener members, means for inserting a tape into said fastener members while held in the holder, and reciprocable means for removing said fastener members and assembled tape from the holder in a direction laterally of the holder.

20. In a machine for making fastener stringers, the combination set forth in claim 19 wherein said reciprocable means comprises a member having teeth spaced and arranged to enter into the fastener member recesses, said teeth increasing in length progressively whereby the fastener members are gradually ejected from the holder.

21. In a machine for making fastener stringers, means for guiding and forcing the shouldered edge of a tape into substantially parallel sided slots of fastener members comprising a guide through which said tape passes having a portion with relatively thin edges adapted to bear against the shouldered edge and force the same into said slots.

22. In a machine for making fastener stringers, the combination of means for holding a row of slide fastener members each of which has a slotted end to receive a tape, said holding means including means for maintaining the members with their tape receiving slots in alignment and in the same uniform spacing as the fastener members are to occupy on the finished fastener stringer, means for supporting and guiding a tape parallel to said row of fastener members, and means for forcing the edge of said tape into said aligned slots whereby said fastener members are temporarily assembled with said tape, being held in position by friction.

23. In a machine for making fastener stringers, the combination of a circular carrier having means for holding a row of fastener members around its periphery, each of said fastener members having slotted ends extending outwardly from the axis of said carrier, means for guiding a beaded edge tape tangentially of said carrier in line with the aligned slots of said fastener members, and means for forcing the beaded edge of said tape into said slots whereby said fastener members and tape are assembled, the fastener members being held temporarily in position by friction.

25. In a machine for securing fastener units, having divergent jaws, in spaced series to a stringer tape, unit-presenting means comprising a rotary circular carrier having a series of uniformly spaced sockets for units, means for turning the carrier step-by-step intermittently, each step substantially equalling the distance between sockets, means operative to deliver a unit into each socket as the latter reaches a predetermined point, a guard extending along the periphery of the carrier and arranged to prevent escape of units from the sockets in which they have been placed, and means adjacent to the end of said guard operative to remove units from their sockets.

24. In a machine for securing fastener units, having divergent jaws, in spaced series to a stringer tape, unit-presenting means comprising an endless carrier having a series of sockets each adapted to hold a unit, means operative to advance the carrier step-by-step, each step being substantially equal in length to the spaces between sockets, means operative at a predetermined point in the path of said sockets to deliver units one by one into successive sockets of the carrier, and a guard extending along the path of said sockets from the point at which the units are placed in the sockets to a point of delivery of the units from the sockets.

GIDEON SUNDBACK.